(12) United States Patent
Singer et al.

(10) Patent No.: US 10,698,225 B2
(45) Date of Patent: Jun. 30, 2020

(54) MICROSCOPE AND METHOD FOR SPIM MICROSCOPY

(71) Applicant: Carl Zeiss Microscopy GmbH, Jena (DE)

(72) Inventors: Wolfgang Singer, Aalen (DE); Jorg Siebenmorgen, Jena (DE); Tiemo Anhut, Jena (DE); Ralf Wolleschensky, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 251 days.

(21) Appl. No.: 14/411,710

(22) PCT Filed: Jun. 26, 2013

(86) PCT No.: PCT/EP2013/001878
§ 371 (c)(1),
(2) Date: Dec. 29, 2014

(87) PCT Pub. No.: WO2014/005682
PCT Pub. Date: Jan. 9, 2014

(65) Prior Publication Data
US 2015/0168732 A1    Jun. 18, 2015

(30) Foreign Application Priority Data

Jul. 2, 2012  (DE) .................. 10 2012 013 163

(51) Int. Cl.
*G02B 21/16* (2006.01)
*G02B 21/00* (2006.01)
(Continued)

(52) U.S. Cl.
CPC ..... *G02B 27/0927* (2013.01); *G02B 21/0032* (2013.01); *G02B 21/0076* (2013.01);
(Continued)

(58) Field of Classification Search
CPC ............ G02B 21/0076; G02B 21/0032; G02B 21/06; G02B 21/16; G02B 21/367;
(Continued)

(56) References Cited

U.S. PATENT DOCUMENTS 6,975,458 B1   12/2005  Kanzler
2003/0189097 A1  10/2003  Li
(Continued)

FOREIGN PATENT DOCUMENTS

DE      102 57 423 A1    6/2004
DE  10 2007 063 274 A1   6/2009
(Continued)

OTHER PUBLICATIONS

Computer-generated Binary Holograms, Brown et al. Mar. 1969.*
(Continued)

*Primary Examiner* — Thomas K Pham
*Assistant Examiner* — Alberto J Betancourt
(74) *Attorney, Agent, or Firm* — Duane Morris LLP

(57) ABSTRACT

A microscope, in particular according to any of the preceding claims, consisting of an illuminating device, comprising an illumination light source and an illumination beam path for illuminating the specimen with a light sheet, a detection device for detecting light emitted by the specimen, and an imaging optical unit, which images the specimen via an imaging objective in an imaging beam path at least partly onto the detection device, wherein the light sheet is essentially planar at the focus of the imaging objective or in a defined plane in proximity of the geometrical focus of the imaging objective, and wherein the imaging objective has an optical axis, which intersects the plane of the light sheet at an angle that is different from zero, preferably perpendicularly, wherein an amplitude and/or phase filter is provided in the illumination beam path, said filter acting as a sine spatial
(Continued)

filter in that it limits the illumination light in at least one spatial direction by filtering the spatial frequencies that occur with a sine function and/or in that the illumination light is limited with regard to the phase and amplitude thereof in at least one spatial direction by a sine filter function, and/or a combined amplitude and phase filter is provided in the illumination beam path, said filter shaping the light sheet by influencing the transmission profile of the illumination light distribution with a sine filter function.

3 Claims, 11 Drawing Sheets

(51) Int. Cl.
G02B 21/36 (2006.01)
G02B 21/06 (2006.01)
G02B 27/09 (2006.01)
(52) U.S. Cl.
CPC ............ *G02B 21/06* (2013.01); *G02B 21/16* (2013.01); *G02B 21/361* (2013.01); *G02B 21/367* (2013.01); *G02B 27/0988* (2013.01)
(58) Field of Classification Search
CPC .. G02B 21/0056; G02B 21/26; G02B 21/361; G02B 27/0927; G02B 27/0988
USPC .......................................... 359/368–398, 561
See application file for complete search history.

(56) References Cited

U.S. PATENT DOCUMENTS

2006/0033987 A1* 2/2006 Stelzer .................. G02B 21/06
359/385
2009/0021811 A1* 1/2009 Yamamoto ............. G11B 7/083
359/3
2011/0122488 A1 5/2011 Truong et al.

FOREIGN PATENT DOCUMENTS

JP 2006-509246 3/2006
WO WO 2004/053558 A1 6/2004

OTHER PUBLICATIONS

Feldkhun ("Doppler Encoded Excitation Patterning (DEEP) Microscopy"; University of Colorado at Boulder, Jan. 2010, p. 52-53) (Year: 2010).*
Scannning interference microscopy; Wilson et al., Department of Engineering Science, University of Oxford, Oxford, 1994 (Year: 1994).*
Notification of Transmittal of Translation of the International Preliminary Report on Patentability, International Preliminary Report on Patentability and Written Opinion of the International Searching Authority.
Stelzer, Ernst, et al., "Resolution enhancement in a light-sheet-based microscope (SPIM)", Optics Letters 2006, 31(10):1477-1479.
Stelzer, Ernst, et al., "Optical Sectioning Deep Inside Live Embryos by Selective Plane Illumination Microscopy", Science 2004, 305:1007-1009.
Zeiss Elyra, p. 1; http://www.zeiss.com/microscopy/en_us/products/superresolution-microscopy.html#elyra-p-1.
Gutierrez-Vega, J.C., et al., "Experimental demonstration of optical Mathieu beams", Optics Communications 2001, 195(2001):35-40.
Eismann, Michael T., et al., "Iterative design of a holographic beam former", Applied Optics 1989, 28(13):2641-2650.
Japanese Office Action dated Jun. 20, 2017.

* cited by examiner

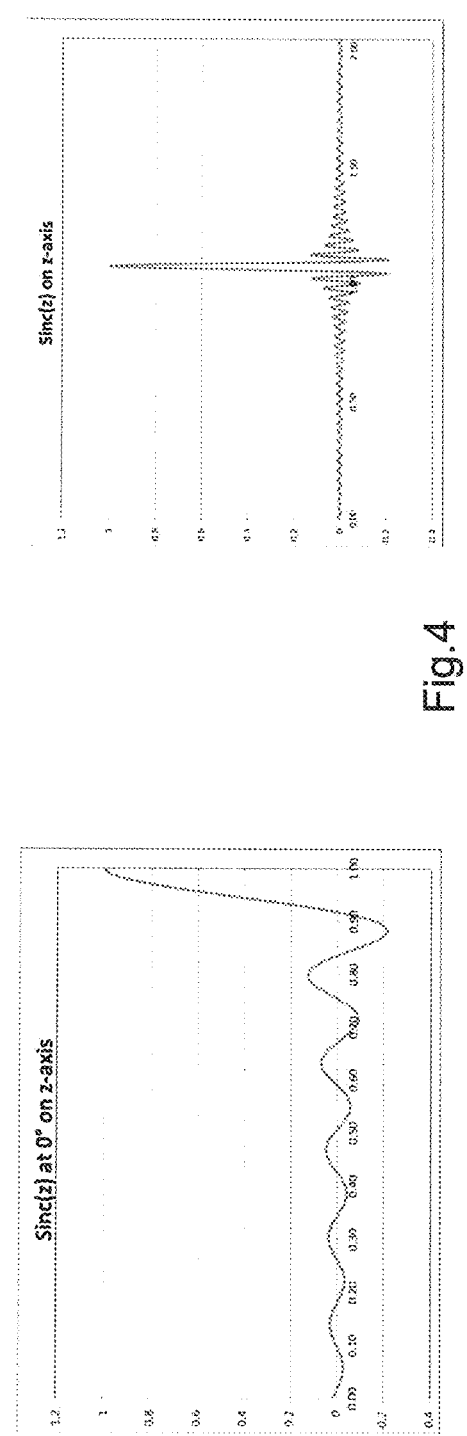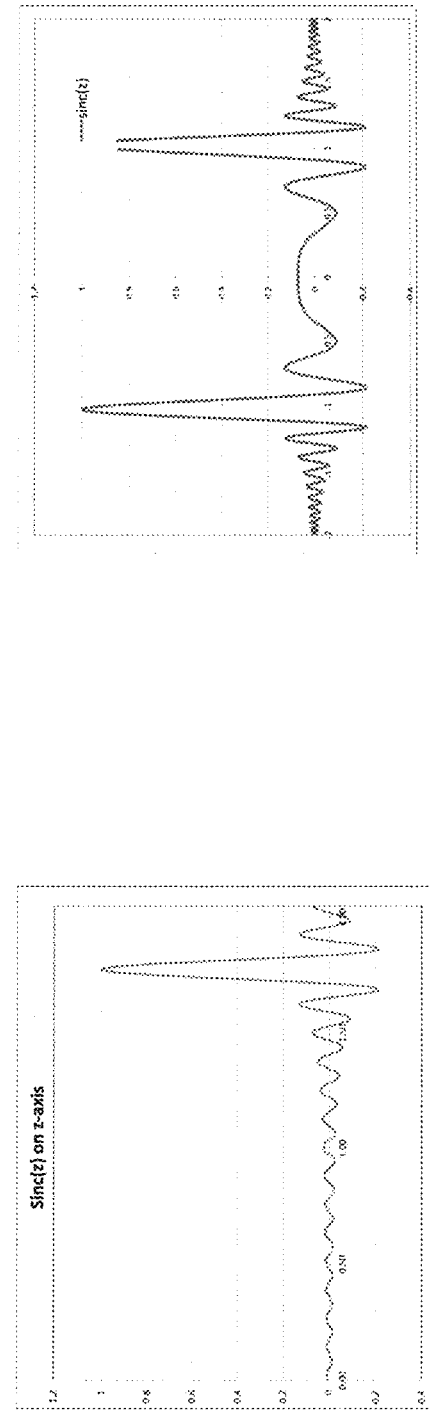
Fig.4
Sinc(vz) with vx=0 (λ=1) and with vx=0.85 NAλ (λ=0.488) (vz axis in each case toward the right)

Fig. 10
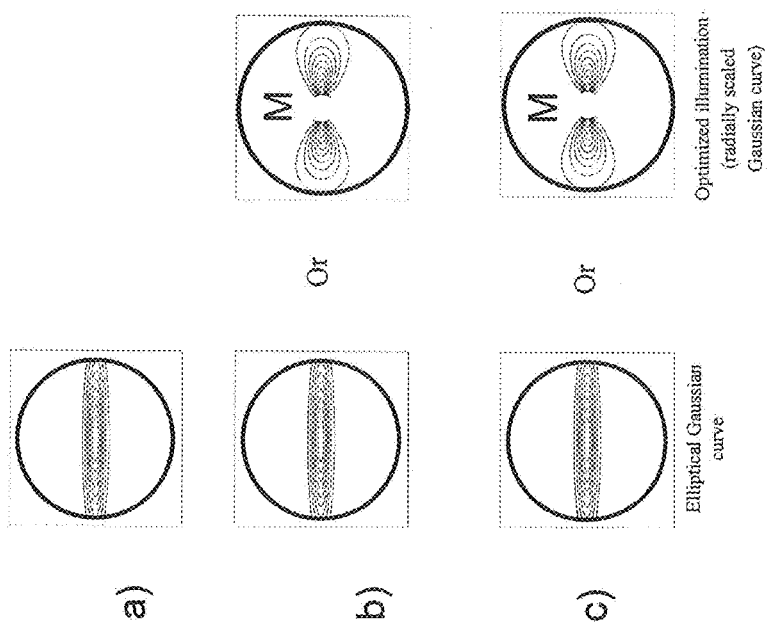
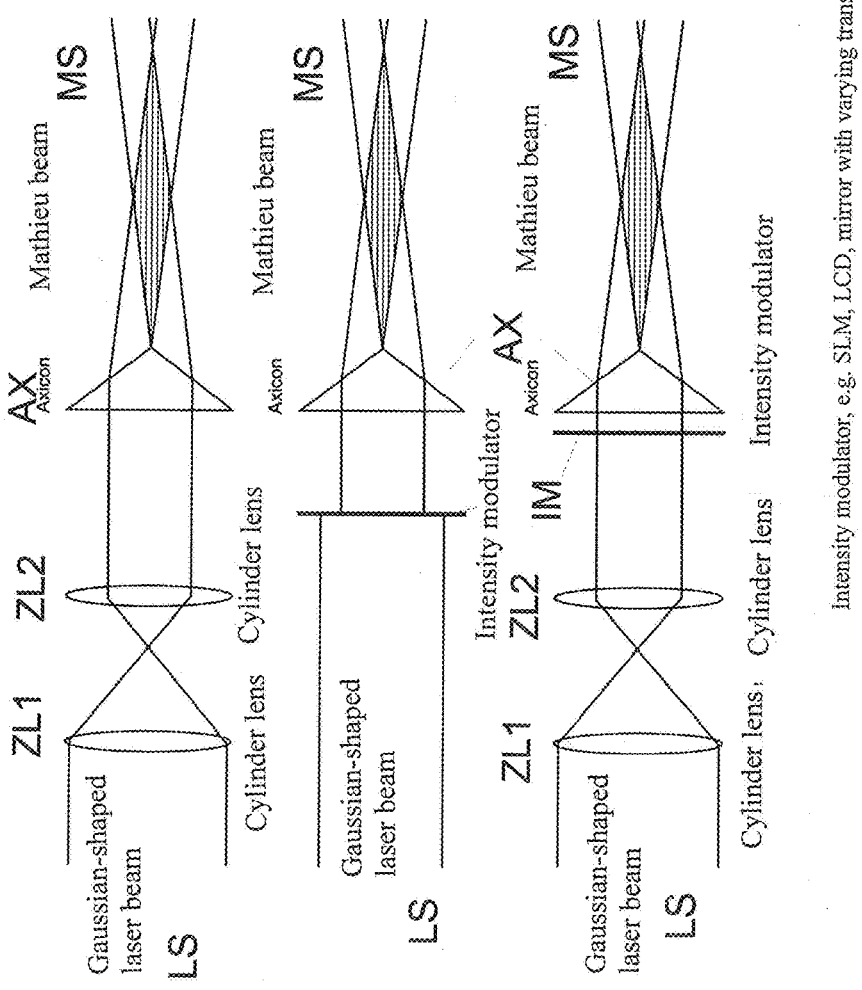

MICROSCOPE AND METHOD FOR SPIM MICROSCOPY

RELATED APPLICATIONS

The present application is a U.S. National Stage application of International PCT Application No. PCT/EP2013/001878 filed on Jun. 26, 2013 which claims priority benefit of German Application No. DE 10 2012 013 163.1 filed on Jul. 2, 2012, the contents of each are incorporated by reference in their entirety.

FIELD OF THE INVENTION

The invention relates to a microscope having an imaging objective for imaging a specimen onto a detector as well as means for illuminating the specimen by means of a light sheet in the focal plane of the imaging objective or in a defined plane close to the focal plane. The illumination means is an illuminating source that emits coherent light.

BACKGROUND OF THE INVENTION

A microscope, in which the illumination beam path and the detection beam path are arranged essentially perpendicular to each other, and in which the specimen is illuminated with a light sheet in the focal plane of the imaging objective, i.e., perpendicular to its optical axis, is designed for the analysis of specimens according to the method of selective plane illumination microscopy (SPIM). In contrast to confocal laser scanning microscopy (LSM), with which a three-dimensional specimen is scanned point by point in different planes with different depths and the obtained image information is subsequently compiled to create a three-dimensional image of the specimen, SPIM technology is based on widefield microscopy and allows the pictorial representation of the specimen on the basis of optical sections through individual planes of the specimen.

The advantages of the SPIM technology consist among other things in the greater speed with which the image information is captured, the lower risk of fading of biological specimens as well as an extended penetration depth of the focus into the specimen.

In principle, the SPIM technology involves the stimulation of fluorophores contained in or incorporated into the specimen with a laser light, which is shaped into a so-called light sheet. In each case, the light sheet is used to illuminate a selected plane in the depth of the specimen and an image of said plane of the specimen is obtained in the form of an optical section using an imaging optical unit. The rapid reciprocating movement of a thin, rotationally symmetric laser beam in the focal plane of the imaging objective is essentially equivalent to said type of stimulus with a static light sheet. In effect, i.e. in the temporal average over the observation period, this results in the shape of a light sheet.

SPIM technology is described for example in Stelzer et al., Optics Letters 31, 1477 (2006), in Stelzer et al., Science 305, 1007 (2004), in DE 102 57 423 A1 and in WO2004/0530558 A1.

The basic design of a SPIM microscope is illustrated in FIG. 1. The light of an illuminating source 1 is shaped to become a light sheet via an illuminating optical unit 2 and guided onto a specimen 3. The specimen and light sheet are located in the focal plane of the imaging objective 4. The optical axis of the imaging objective 4 is perpendicular to the direction from which the specimen 3 is illuminated. Generally, the illuminating optical unit 2 comprises a plurality of optical elements, which collimate the coherent light of the illuminating source 1 and use it to form a light sheet. In the prior art, the illuminating optical unit 2 generally also comprises a cylinder lens, whose flat side is pointing toward the specimen and whose arched side is pointing into the direction of the illuminating source. Several examples of illuminating optical units 2 are explained below, which facilitate the generation of a light sheet with enhanced depth of field and reduced casting of shadows compared to arrangements known from the prior art.

OBJECTS OF THE INVENTION

An object of the invention is to obtain a light distribution (the light sheet) whose expansion in one direction (the y direction) is less than 1 µm, while the expansion in the two other directions is as wide as possible, wherein no light is supposed to be found above and below the light sheet in y direction. Said light above and below the light sheet would impair the measurement from the observation direction (y direction).

The solutions known to date include:

a) Interference patterns can be thin in y direction and in theory essentially have an infinite expansion in x and z direction, although they continue periodically in y such that a very large amount of light is located outside the light sheet b) In theory, Bessel beams (DE 10 2007 063 274 A1) can have an infinite expansion in z direction and have the desired diameter in y, but the power outside the beam in y direction is again extremely high. Scanning a Bessel beam in x direction does indeed yield a light sheet, albeit with a very high luminous power above and below the desired plane.

c) Line focus with cylinder lens: a focus in x direction can be generated with a cylinder lens; if the beam is scanned in z direction by means of defocusing, it is likewise possible to realize a light sheet.

A cylinder lens forms a line focus in x direction (at a distance f behind the cylinder lens) from the incident collimated laser beam. Said line focus can be moved in z direction (defocus, can be realized e.g. by changing the focal depth f using a moveable lens or an SLM). However, said line focus has a very small expansion in z direction (DOF~$\lambda/NA^2$, DOF=depth of focus), whereby the expansion gradually decreases as the line focus gets thinner in y direction.

For example: NA=0.5→if $\lambda$=0.488 µm then DOF~$\lambda/NA^2$~2 µm.

The disadvantages of the solutions mentioned above are the small expansions of the individual beams and the fact that the beam needs to be scanned. In addition, a large amount of light is found in y direction with the Bessel beam and in z direction with the x line focus, said light potentially whitening the specimen. Therefore, another objective is to enlarge the expansions of the light foci.

SUMMARY OF THE INVENTION

The invention relates both to a microscope for "SPIM" microscopy as well as an associated microscopic procedure as well as an operating procedure for a microscope as well as the advantageous uses of sine filters and Mathieu beams for SPIM microscopy listed in the patent claims.

For this purpose, the following is proposed according to the invention:

An expansion-invariant or well-defined distribution in z direction is obtained in that the z component is limited in the frequency spectrum of the light. With the "expansion", each z component obtains a different phase displacement and for this reason, it is advantageous to limit the z components of the frequency spectrum by means of a filter function. In particular, it is proposed to use a sinc(z) function as filter function in z direction.

In principle, other functions are also conceivable, such as a sinc(z)^2 function, although the sine function allows an (idealized) constant profile in z as a special advantage.

Obviously, an accurate filter function can be optimized further; insofar, the sine function is only mentioned here as particularly advantageous for functions that enable a roughly constant beam profile on the axis across a larger area in z direction.

BRIEF DESCRIPTION OF THE DRAWINGS

The structural and functional aspects of the invention will become understood by those skilled in the art by reference to the following detailed description when taken in conjunction with the appended drawings, in which:

FIG. 4 is a set of four graphs showing a generated sinc($v_z$) function along the Z axis with the maximum set at different positions as illustrated in each case at the top right and top left illustrations;

FIG. 10(a) illustrates the Mathieu beam generated by an axicon AX, which is arranged after a cylinder lens arrangement;

FIG. 10(b) illustrates an intensity modulator IM;

FIG. 10(c) illustrates a combination of a cylinder lens arrangement and an intensity modulator.

DESCRIPTION OF THE INVENTION

As noted above, according to the invention, the expansion of a line focus can be enlarged in z direction by means of a sinc(z) filter in front of the cylinder lens. The sinc(z) filter is transformed into the y direction for this purpose and realized as filter in y direction. However, a filter with a relatively complex design is required for this purpose, because the sine function has positive and negative values as is well known. A pure amplitude filter can only accept positive values for the transmission. A negative value of the transmission of the filter corresponds to a phase displacement by $\lambda/2$. However, with an additional phase displacement of e.g. $\lambda/2$, it is also possible to realize negative values for the transmission. The filter function can be constant in x direction.

In other words, according to the invention, the expansion of a line focus can be enlarged in z direction by means of a sinc(z) filter in front of the cylinder lens. The sinc(z) filter is transformed into the y direction for this purpose and realized as filter in y direction. However, a filter with a relatively complex design is required for this purpose, because the sine function has positive and negative values as is well known. A pure amplitude filter can only accept positive values for the transmission. A negative value of the transmission of the filter corresponds to a phase displacement by $\lambda/2$. However, with an additional phase displacement of e.g. $\lambda/2$, it is also possible to realize negative values for the transmission. The filter function can be constant in x direction.

Figure 1:
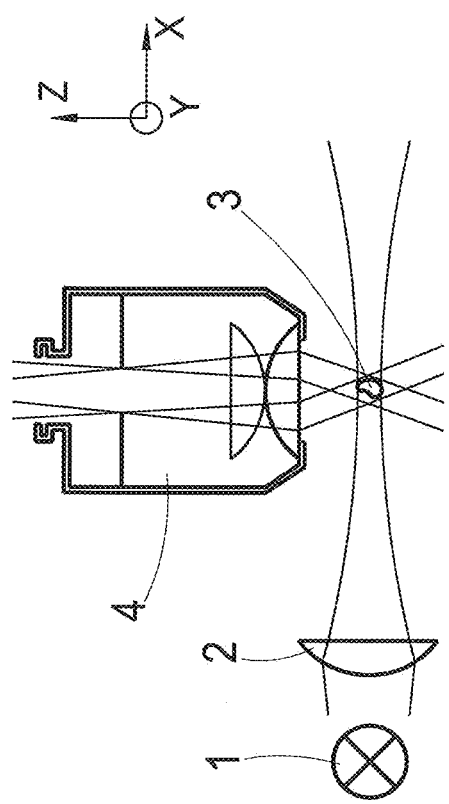
FIG. 1 is a schematic illustration of a SPIM microscope.
Figure 2:
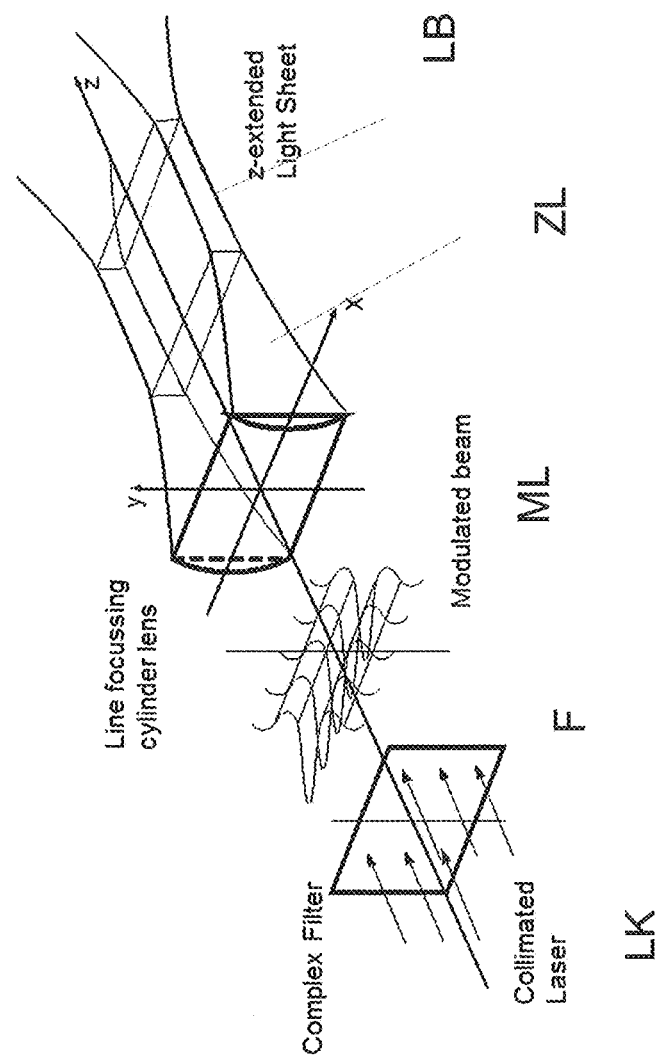
FIG. 2 is a schematic illustration showing a transmission gradient of a complex filter used in a SMIP microscope.

FIG. 2 illustrates such an example for the theoretically ideal transmission gradient of a complex filter. The schematic representation shows a collimated laser beam LK that passes through a spatial filter F arranged in the aperture diaphragm of the used optical unit and whose amplitude and phase are influenced by said filter. The corresponding spatial light distribution is schematically illustrated as a modulated laser beam ML.

A spatial frequency filter sinc($v_z$) is initially applied here.

A cylinder lens ZL and the generated light sheet LB follow in the direction of illumination. Advantageously, the sinc($v_z$) corresponds to a sine with zero position where $v_y=0$ (on axis), which was resealed in the $v_y$ direction by means of the Ewald summation. The sinc($v_z$) thus projected onto the y axis achieves the expansion in z direction.

Yet, the sinc($v_z$) projected into the $v_y$ axis does not yet ideally limit the beam profile in y direction. For example, the sinc($v_z$) projected into the y direction is therefore superimposed with a sinc($v_y$) (through multiplication); said sinc($v_y$) helps ensure that the light sheet is limited in y direction, while the sinc($v_z$) projected into the $v_y$ axis ensures that the light sheet remains constant across a certain z distance.

The two sine functions are affecting one another; a small y expansion requires an extensive sinc($v_y$), which should roughly correspond to the projected sinc($v_z$), as shown in the example.

As a result, a DOF–8 μm can be achieved in the example. Other examples are described on the following pages.

In a further example, the light sheet can be designed with an arched, rotationally symmetric optical unit, for example having spherical surfaces instead of a cylindrical optical unit, which has an essentially constant design along the x axis. The filter function in z direction (sinc($v_z$)) is then projected as rotationally symmetric function into the x-y plane and multiplied with one or two other filter functions in x and y to obtain the desired limitation in y and the desired expansion in x and z, that is, for example with a very broad sinc($v_y$) function in y direction for the thin light sheet in y direction and a very narrow sinc($v_x$) function in x direction for a large expansion in x direction.

Figure 3:
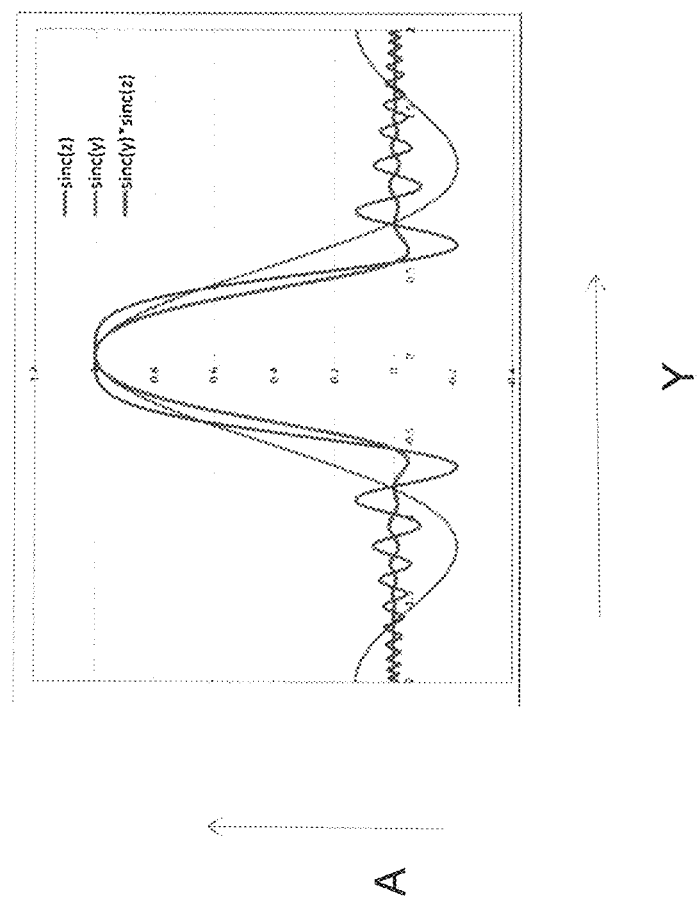
FIG. 3 is a graph of an amplitude distribution in a cross section along the Y axis of FIG. 2.

An amplitude distribution A superimposed by three filter functions (x, y, z) is illustrated as an example in FIG. 3 in a cross-section along plane of section Y/Z along the Y axis of FIG. 2.

Surprisingly, this makes it possible to realize an extended line focus with a focal length of 10 μm in z direction with a thickness of approximately 1 μm in y (wavelength: 0.488 (100 μm×10 μm×1 μm, X×Z×Y), even without the use of an anamorphic optical unit such as the illustrated cylinder lens.

In addition, it is possible to realize a light sheet with 100 µm×100 µm×4 µm (width x times depth z times thickness in y).

On the axis (angle: zero), the sine functions simply overlap and "destroy" one another, i.e., the respective sine function with the smaller width is always dominant (see also FIG. 3).

To separate the sine functions from each other, i.e., to transmit as much frequency information as possible, the filter can be placed extra-axially in an aperture diaphragm of the objective, ideally with an aperture that is as large as possible (e.g. for NA=0.85 with an objective NA=1). Surprisingly, a light sheet with an even smaller thickness is possible as a result, for example 100 µm×100 µm×2 µm (x times z times y). In general, the zero point of the sine functions of the aperture diaphragm of the illuminating optical unit can be selected freely.

Smaller light sheets with a diameter in y of 1 µm are also conceivable (e.g. 10 µm×100 µm×1 µm, X×Z×Y, with a wavelength of 0.5 µm). In particular, light sheets with large lateral expansions and at the same time a smaller thickness in y direction and not much light outside the light sheet in y direction can be generated with the new filter, which are considerably superior to the light sheets known from the prior art, for example comprising a larger dimension in x or z by at least factor two compared to Gaussian beams, or a lower light intensity in y direction outside the light sheet by at least factor 10 compared to a Bessel beam or a double-beam interference pattern.

Furthermore, the light sheets can run both in z direction as well as in x direction (depending on the position of the filters in the aperture diaphragm), thus making the arrangement particularly flexible.

The light sheets can be modulated with a phase function, to move them in x, y and z direction (focus or shift). As a result, the light sheets can e.g. also be moved (scanned) through space with an SLM (spatial light modulator). Said SLM would be used alone or in cooperation with an amplitude filter, to achieve a displacement of the light sheet, for example in y direction. As a result, a confocal scanning through the specimen is possible with the observation beam, e.g. from the y direction.

Furthermore, a plurality of sinc^3 filters and hence light sheets can be arranged side by side or on top of each other. This way, the surface of the light sheet can be enlarged or an additional de-excitation stimulated at the edge of an excitation region, e.g. for STED.

The light sheets can be modulated (structured) by incorporating e.g. two sinc^3 filters into the aperture diaphragm without defocus or phase displacement. As a result, the modulation frequency can be adjusted freely. The resulting interference field can be used for SIM (ZEISS Elyra, p. 1) or similar methods with structured illumination. The light sheet thickness can be reduced further (e.g. 0.7 µm), whereby the expansion of the light sheet decreases.

Mathematical Formulas and Definitions:
SINC function:

$$(\text{sinc}(\text{arg}) = \frac{\sin(\pi \cdot \text{arg})}{\pi \cdot \text{arg}}$$

Ewald summation:

$$v_z = \sqrt{\left(\frac{n}{\lambda}\right)^2 - v_x^2 - v_y^2}$$

Off-axis: with off-axis position $$rv_x : rv_z = \sqrt{\left(\frac{n}{\lambda}\right)^2 - rv_x^2}$$

Therefore $$\arg_z = \pi \left[\sqrt{\left(\frac{n}{\lambda}\right)^2 - v_x^2 - v_y^2} - rv_z\right] / \Delta_z$$

Special case: on-axis position with $$v_x = 0: \arg_{z, on\,axis} = \pi \left[\sqrt{\left(\frac{n}{\lambda}\right)^2 - v_x^2 - v_y^2} - \frac{n}{\lambda}\right] / \Delta_z$$

$$f_{v_z}(v_x, y_x) = \frac{\sin(\arg_z)}{\arg_z}$$

In the illustrations of FIG. 4, a generated sinc($v_z$) function along the Z axis with the maximum set at different positions is illustrated in each case at the top right and top left.

It becomes evident that a better Z profile is achieved if the maximum is arranged in the center.

Sinc($v_z$) with $$v_x = 0.5 \frac{NA}{\lambda} (\lambda = 0.488)$$

is illustrated as an example at the bottom left (left image, $v_z$-axis toward the right) and the same sinc($v_z$) filter is projected into transversal coordinates according to the Ewald summation at the bottom right (right image); this gradient corresponds to the complex filter in the aperture diaphragm that needs to be inserted to obtain the corresponding, partly constant gradient in z direction.

Surprisingly, said rescaling according to the invention (retransformation or projection) of the sinc($v_z$) function according to the Ewald summation in y direction is particularly advantageous.

Figure 5:
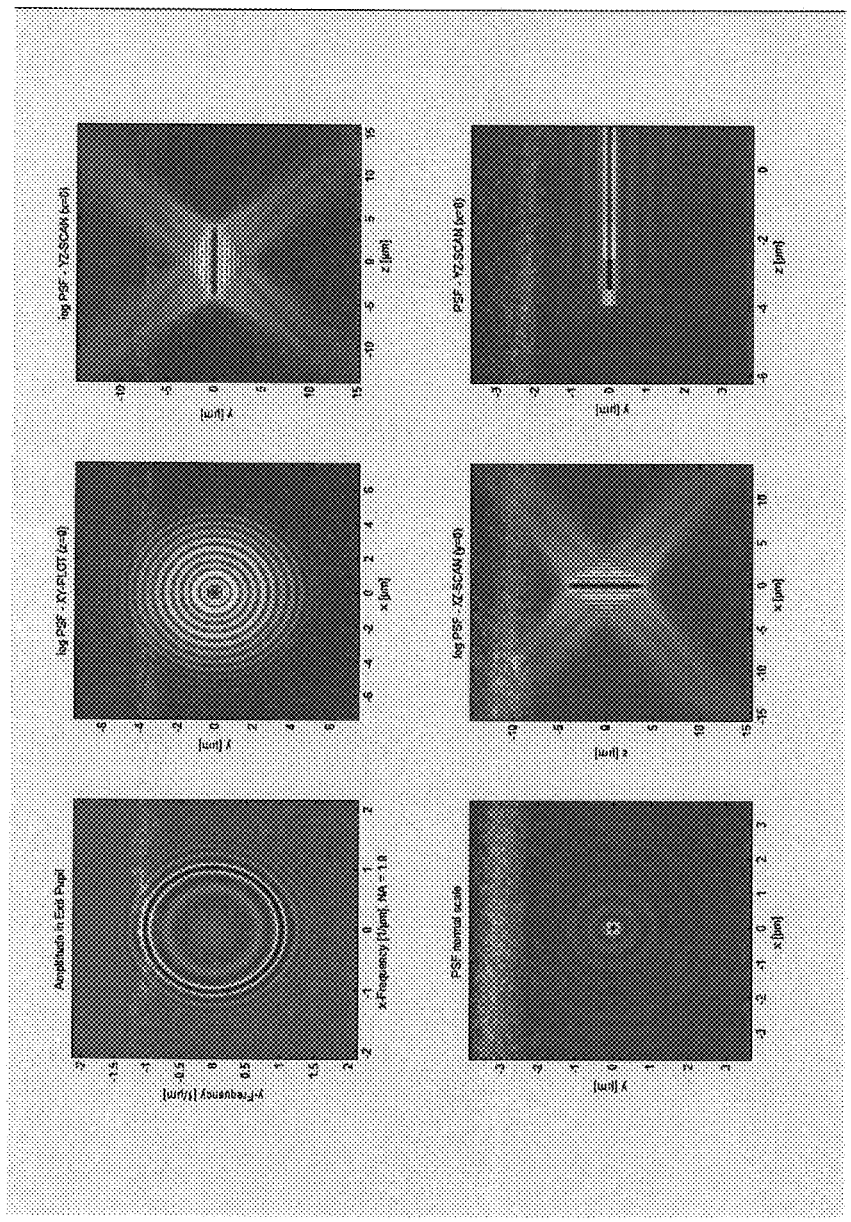
FIG. 5 contains illustrations of sectional drawings in each case as a sinc($v_z$) filter as a complex filter in the aperture diaphragm.

Initially, the representation in FIG. 5 at the top left in each case shows a sinc($v_z$) filter as a complex filter in the aperture diaphragm as a sectional drawing with the main maximums on the side as illustrated at the bottom right in FIG. 4. A section through the x-y plane at an ideal focal position (z=0) of a lens (of an objective), in whose aperture diaphragm the sinc(z) filter is arranged (point spread function, PSF of the system with filter) is illustrated in the center on the top (in logarithmic scaling) and the y-z gradient (with z: along the direction of the spread of the light) at the top right.

In the bottom row, the elements mentioned above are illustrated in linear scaling from left to right, said scaling corresponding to an actual light distribution on the right side:

Bottom left: section through the x-y plane (z=0)—PSF in linear scaling
Bottom center: x-z gradient
Bottom right: y-z gradient, linear scaling, zoomed to the left area of the "light needle".

It becomes apparent that a beam gradient with constant strong directional limitation can advantageously be achieved with a sufficiently long Z gradient.

General sinc^3 filter $$\arg_x = \pi[v_x - rv_x]/\Delta_x$$

$$\arg_y = \pi[v_y - rv_y]/\Delta_y$$

$$\arg_{z,\text{off axis}} = \pi\left[\sqrt{\left(\frac{n}{\lambda}\right)^2 - v_x^2 - v_y^2} - rv_z\right]/\Delta_z$$

Complex filter:

$$F(v_x, v_x) =$$

$$f_{v_x}(v_x, v_x) \cdot f_{v_y}(v_x, v_x) \cdot f_{v_z}(v_x, v_x) = \frac{\sin(\arg_x)}{\arg_x} \cdot \frac{\sin(\arg_y)}{\arg_y} \cdot \frac{\sin(\arg_z)}{\arg_z}$$

Figure 6:
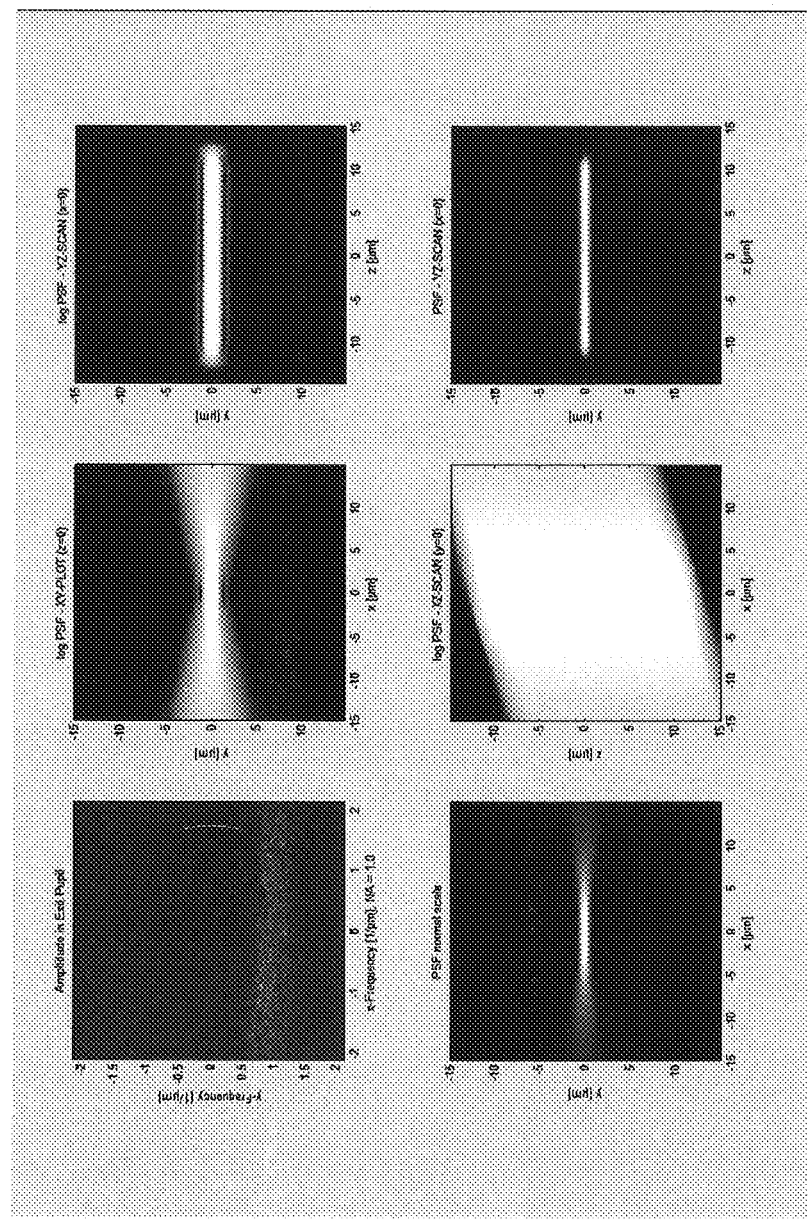
FIG. 6 illustrates as an example a one-sided off-axis function in the aperture diaphragm according to the invention.

The representation in FIG. 6 illustrates as an example a one-sided off-axis function in the aperture diaphragm according to the invention in logarithmical or linear scaling (left top and bottom), the illumination situation in the focus in X-Y direction (center top) as well as XZ direction (center bottom) as well as the y/Z distribution of the light in logarithmical (right top) as well as linear scaling (right bottom).

Figure 7:
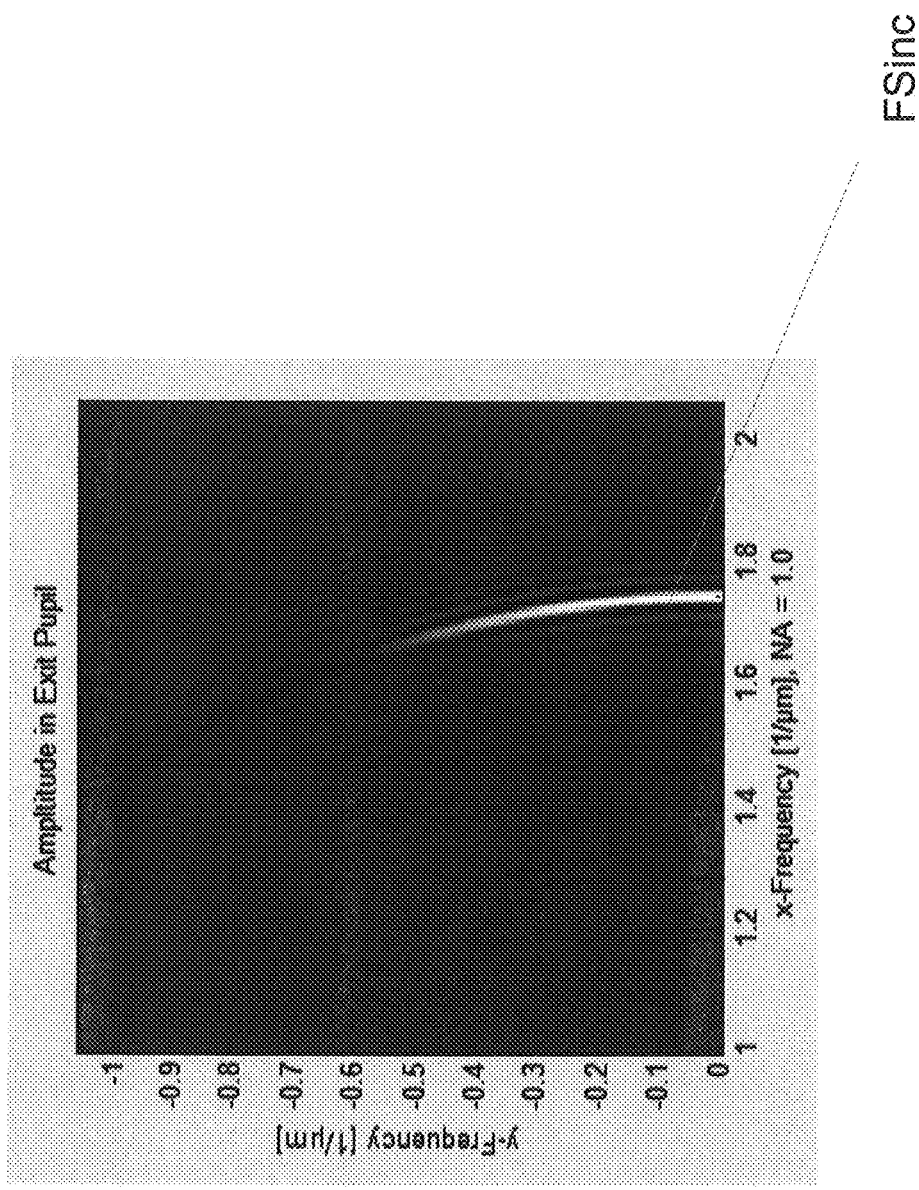
FIG. 7 shows a section of an applied, asymmetrical and one-sided sine function.

A section of an applied, asymmetrical and one-sided sine function F Sinc is visible in the aperture diaphragm as an example in FIG. 7.

Figure 8:
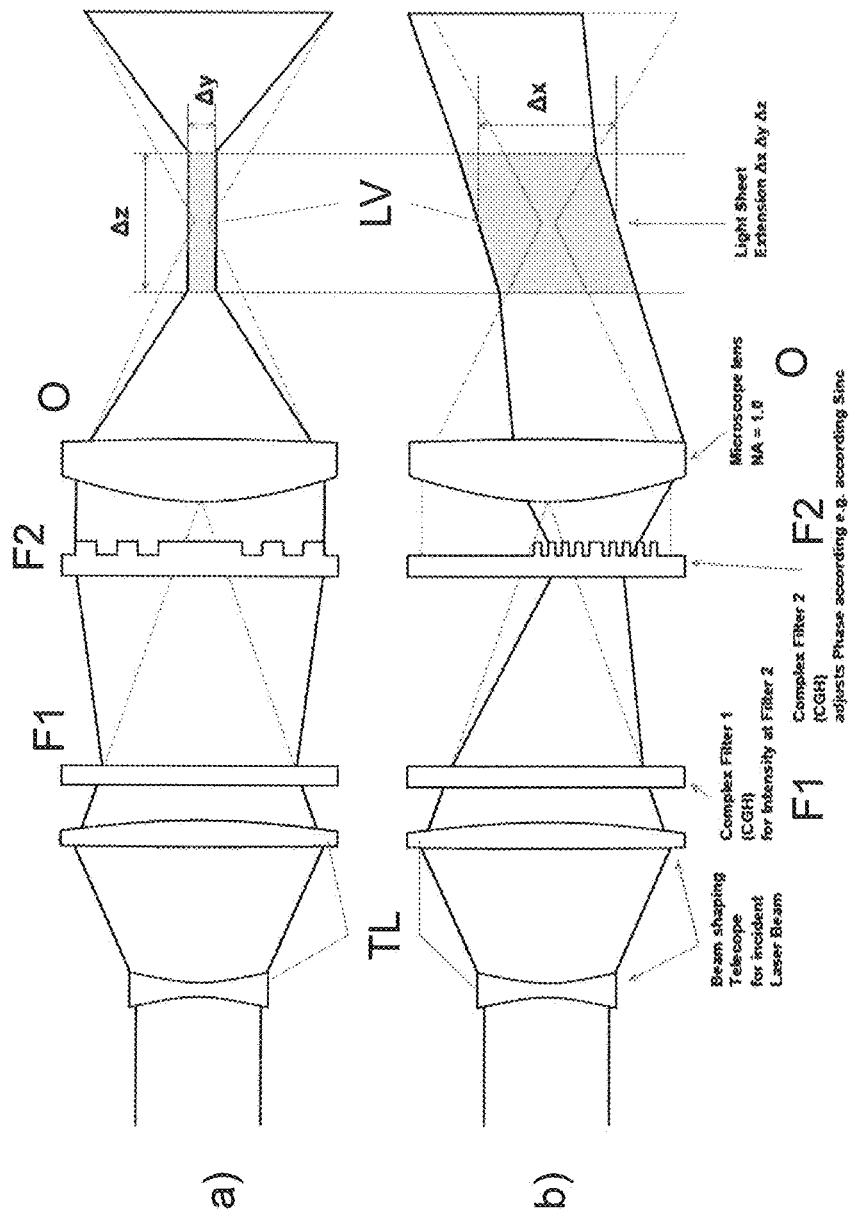
FIG. 8 shows part of the refractive power from a first filter having been shifted into a collimator (beam-shaping telescope)

FIG. 8: General Realization (as an Example):

The complex filter described above can be realized with a simple complex filter in the aperture diaphragm (corresponding to $F(v_x, v_x)$); however, this creates a very small transmission, because $F(v_x, v_x)=0$ almost everywhere.

Alternatively, a very high transmission can be achieved with two filters. The first filter 1 is designed such that it generates the desired intensity in the aperture diaphragm that corresponds to the amplitude of the filter. The filter 1 can be designed e.g. as a CGH (computer-generated hologram) and easily calculated and manufactured according to known methods. The second filter is a pure phase element (as indicated schematically below), which generates the negative values of the transmission of the complex filter through simple phase shifts by $\lambda/2$.

The filters can be designed for a collimated or any other incident coherent laser beam.

In the example in FIG. 8, part of the refractive power from the first filter has been shifted into the collimator (beam-shaping telescope).

The representation in FIG. 8 shows in a) a schematic section along the Y/Z plane and in b) along an X/Z plane. An element for forming a beam (telescope, TL) is followed in the direction of the illumination by a combination comprising a first filter F1, which can be an amplitude filter and a second filter F2 as phase filter, wherein the second filter F2 is advantageously arranged in the entrance pupil of an optical unit O.

The optical unit O can be a conventional objective.

F1 and F2 can also both be phase filters. Together, they create a light distribution in the entrance pupil that corresponds to a three-dimensional (X, Y, Z) sine function as spatial filter function for the light distribution generated after the light transmission by the optical unit O.

Said complex filter function results in an extensive planar light distribution LV in the Z direction, advantageously with a very small expansion in Y direction (perpendicular to the light surface) below a range of 5 micrometers (even up to below 2 micrometers!)

For the realization and manufacture of the filter combinations mentioned above, reference is additionally and as an example made to the following literature sources:

"Iterative design of a holographic beam former", Eismann, Tai, Cederquist, Applied Optics, Vol. 28, No. 13, Jul. 1, 1989.

Mathieu Beams

In addition to an extensive illumination by way of a light sheet, WO2004/053558 (A1) contains a description according to which a light sheet can be generated by the scanning motion of a "line-like" flying spot beam (FIG. 7 in that document). Hereby, a relative motion can occur between the specimen and the illumination by moving the specimen or the light beam to generate an extensive illuminated area.

As a matter of fact, the use of Mathieu beams to form illumination beams of a barcode scanner has been disclosed in US2003/0189097 A1.

In the z direction, Mathieu beams are virtually propagation-invariant; their beam profile in the xy plane is virtually independent of the z position. In the z direction, a line focus with a dimension of approx. 1 μm in y direction is possible. Indeed, the beam does diverge in y direction, although this can be suppressed. Surprisingly, it is therefore possible to realize a SPIM light sheet with a Mathieu beam by scanning in x direction, because no interfering light is present within the aperture of the observation beam in the direction of observation (y direction).

In the frequency range, the Mathieu beam consists of two opposing frequency contributions; this results in a high-frequency modulation of the beam in x direction. Said modulation can advantageously be suppressed by blocking one of the two frequency contributions, e.g. by shading one half of the aperture diaphragm or by generating only one half of the Mathieu spectrum.

With regard to the physical basics, reference is made to "Experimental demonstration of optical Mathieu beams", Optics Communications 195(2201), 35-40.

Advantageous optical arrangements for the generation of Mathieu beams that are strongly limited in one direction are described below, such as they could be used in a particularly advantageous fashion for the SPIM application.

Figure 9:
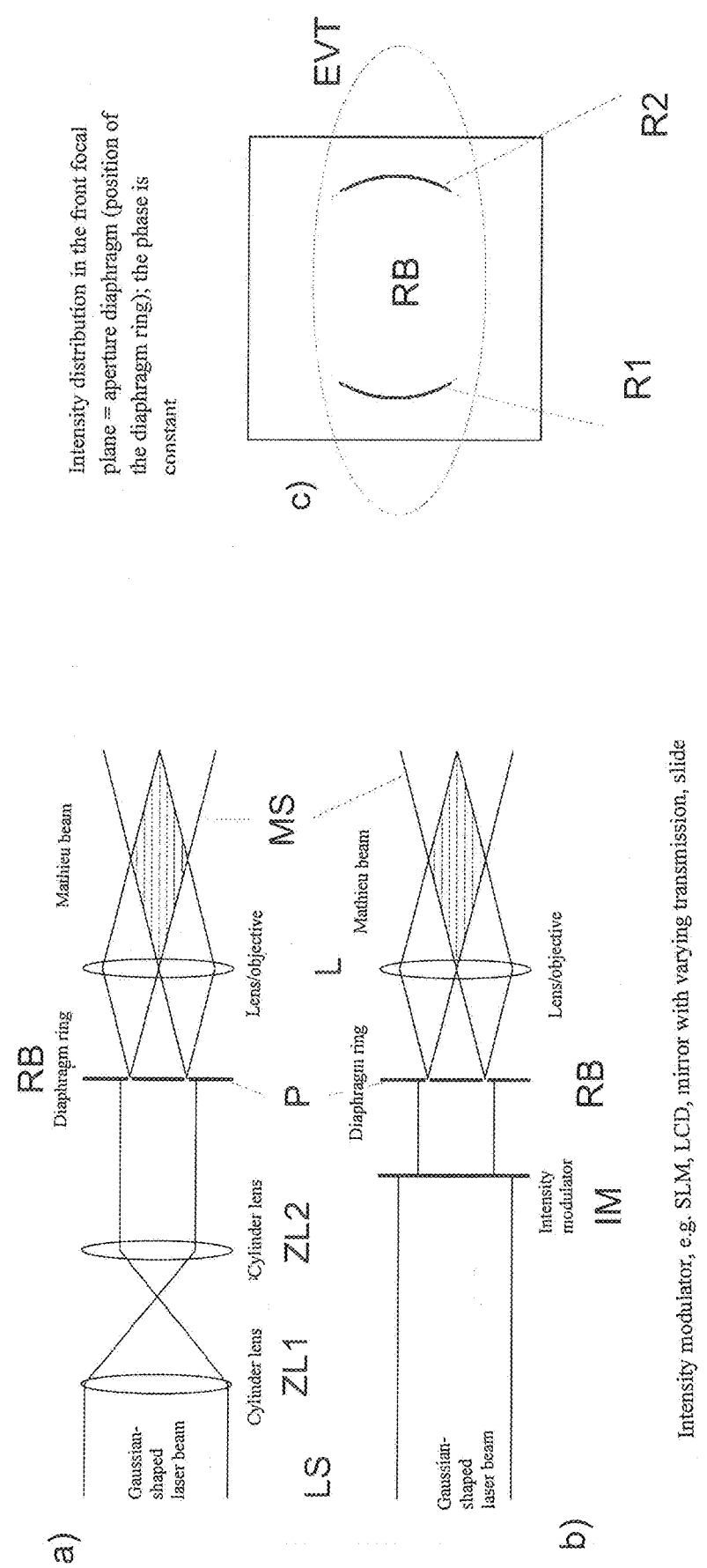
FIGS. 9(a) and (b) are schematic illustrations in side section showing the generation of a Mathieu beam MS from a Gaussian-shaped laser beam LS along an optical illumination axis z.
FIG. 9(c) shows the illumination conditions in the front focal plane of a lens arrangement L, with a diaphragm ring RB arranged in it.

The generation of a Mathieu beam MS from a Gaussian-shaped laser beam LS along an optical illumination axis z is in each ease schematically illustrated in a side section in the Z plane in FIGS. 9*a*) and *b*).

FIG. 9*c*) shows the illumination conditions in the front focal plane of a lens arrangement L, with a diaphragm ring RB arranged in it. In order to generate a Mathieu beam, the diaphragm ring must be illuminated with an elliptical Gaussian beam. An advantageous method for generating said light distribution is illustrated in FIG. 9*a*). The cylinder lens arrangement comprising two suitable cylinder lenses ZL1, ZL2 hereby generates the required elliptical illumination distribution. When it passes through the diaphragm ring, the diaphragm ring is only partly captured by the illumination distribution, and two symmetrical, semi-circular parts R1, R1 are formed in the plane of the aperture diaphragm, which generates a y-limited Mathieu beam after the lens arrangement in the further course.

If one of the two parts R1 or R2 is shielded, e.g. by the partial closure of the diaphragm ring, a beam limited in y direction can be generated, which, in contrast to a Mathieu beam, does not have a periodic structure.

In principle, it is obviously conceivable that the top and bottom of the diaphragm ring can be covered rather than be equipped with an elliptical beam cross-section, in order to generate the two semi-circular areas according to FIG. 9c.

Instead of a beam formation with cylinder lenses, a planar light modulator such as a "spatial light modulator" (SLM) is arranged after the Gaussian-shaped laser beam in FIG. 9b, which could only transfer light to the required areas of the diaphragm ring in order to again generate a Mathieu beam, like in FIG. 9a.

However, in principle, the SLM could also be arranged in the front focal plane instead of the diaphragm ring and only expose the partial circular areas, as illustrated in 9c).

In FIG. 10a)-c), the Mathieu beam is generated by an axicon AX, which is arranged after a cylinder lens arrangement (10a), an intensity modulator IM (10b) or a combination comprising a cylinder lens arrangement and an intensity modulator (10c).

The cylinder lens arrangement again generates an elliptical light distribution, such that a ring-shaped light distribution is present at the axicon, and no Bessel beams, but Mathieu beams are generated with it.

Analogously to FIG. 9b, said beam formation is again achieved with an intensity modulator IM in FIG. 10b.

The advantage here is that an intermixture of Bessel beams and Mathieu beams can be prevented by influencing the intensity that generates a radially scaled elliptical Gaussian-shaped intensity distribution on the axicon.

On the right side of FIG. 10a-c, the intensity distribution arriving on the axicon shown in the adjacent representations on the left is illustrated, in each case with an elliptical Gaussian distribution on the left and with a radially scaled elliptical Gaussian distribution generated by the light modulator in b) and c) on the right side.

In each case, a central area of the illumination distribution is additionally blocked by IM as illustrated, and a radially scaled elliptical distribution is only generated in the side areas.

Without a limitation by the representations, the beam formation can be optimized further through the IM, SLM or a suitable anamorphic optical unit.

Other possibilities to generate a Mathieu beam consist in incorporating a hologram or a diffractive element into the front focal plane of the lens L and to illuminate said hologram or element with a laser. If a diffractive element or an SLM is used, it is additionally also possible to omit the lens L.

Figure 11:
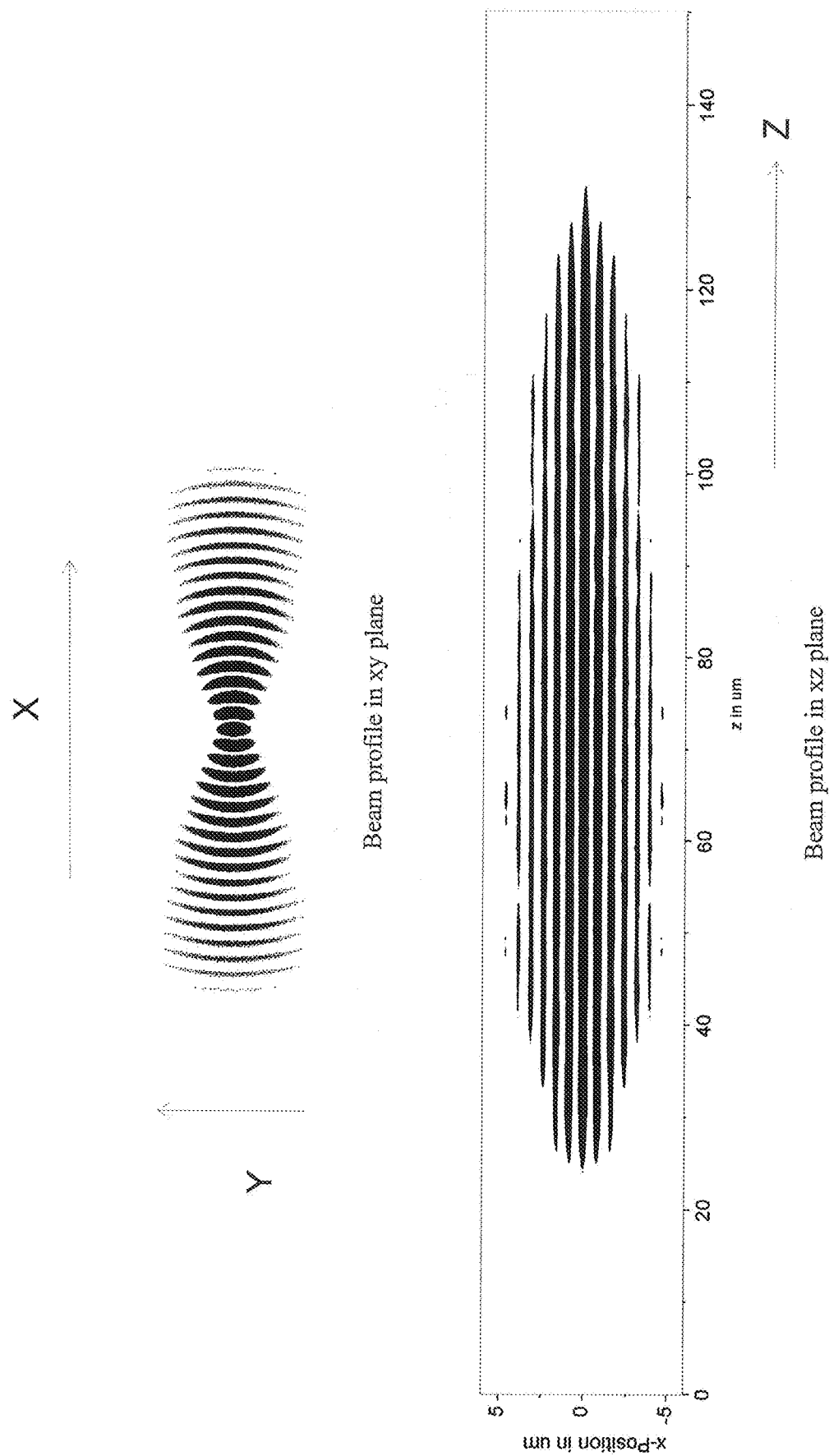
FIG. 11 contains a representation of the illumination distribution of the generated Mathieu beam in the XY plane at a location z0 in the optical axis or in the XZ plane in a section along the optical axis z.

The Mathieu beam comprises a high-frequency intensity modulation in x direction. Consequently, the beam can be used to increase the axial resolution through structured illumination. Hereby, 3 fluorescence images of the specimen are generated with a static Mathieu beam, wherein the beam is in each case shifted for each image by a phase of 120° in x direction. The three images are allocated to obtain a resulting image with improved sectioning. FIG. 11 contains a representation of the illumination distribution of the generated Mathieu beam in the XY plane at a location z0 in the optical axis or in the XZ plane in a section along the optical axis z as an example. An advantageous limitation of the beam profile in Y direction becomes apparent.

The X direction would correspond to the scanning direction for the generation of the planar light distribution.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A microscope comprising:
    an illuminating device, having an illumination light source and an illumination beam path with an optical axis for illuminating a specimen with a light sheet,
    a detection device for detecting light emitted by the specimen,
    an imaging optical unit, which images the specimen via an imaging objective in an imaging beam path at least partly onto the detection device,
    said light sheet being planar at the focus of the imaging objective or in a defined plane in proximity of the geometrical focus of the imaging objective, and said imaging objective having an optical axis, which intersects the plane of the light sheet at an angle that is different from zero,
    an amplitude or phase filter provided in the illumination beam path, said filter acting as a sinc(z) spatial filter by limiting the illumination light in at least a spatial direction z parallel to said optical axis of said illumination beam path by filtering with a sinc function the occurring spatial frequencies and enabling a constant beam profile on the axis across an area of the light sheet in the z direction.

2. A microscope according to claim 1, wherein said amplitude or phase filter is arranged at least partly in or in proximity of a plane of the aperture diaphragm of an illumination optical unit and/or the filter is realized with a hologram (CGH) and/or a diffractive optical unit and/or the filter is formed at least partly by a spatial light modulator (SLM) and/or the light sheet is displaced perpendicular to the direction of the light with the SLM and/or the focal plane of the imaging objective is displaced when the light sheet is displaced and/or that an asymmetrical sinc function/off-axis distribution is generated in the plane of the aperture diaphragm and/or that a sinc filter acting extra-axially to the optical axis is provided and/or a superimposition of a plurality of sinc filters is provided for structuring the light sheet and/or a sinc function rescaled with the Ewald summation is provided as filter function and/or the filter is combined with an anamorphic optical unit in the illumination beam path for forming the beam.

3. A microscope according to claim 1, wherein said angle that is different than zero being ninety degrees.

* * * * *

UNITED STATES PATENT AND TRADEMARK OFFICE
CERTIFICATE OF CORRECTION

| | |
|---|---|
| PATENT NO. | : 10,698,225 B2 |
| APPLICATION NO. | : 14/411710 |
| DATED | : June 30, 2020 |
| INVENTOR(S) | : Wolfgang Singer et al. |

It is certified that error appears in the above-identified patent and that said Letters Patent is hereby corrected as shown below:

On the Title Page

Abstract, Line 15      now reads: "the illumination beam path, said filter acting as a sine spatial"
                      should read -- the illumination beam path, said filter acting as a sinc spatial --

Abstract, page 2,      now reads: "occur with a sine function and/or in that the illumination"
Line 3                 should read -- occur with a sinc function and/or in that the illumination --

Abstract, page 2,      now reads: "thereof in at least one spatial direction by a sine filter"
Line 5                 should read -- thereof in at least one spatial direction by a sinc filter --

Abstract, page 2,      now reads: "illumination light distribution with a sine filter function."
Line 9                 should read -- illumination light distribution with a sinc filter function. --

In the Specification

Column 2, Line 60      now reads: "as the advantageous uses of sine filters and Mathieu beams"
                      should read -- as the advantageous uses of sinc filters and Mathieu beams --

Column 3, Line 6       now reads: "a sinc(z)^2 function, although the sine function allows an"
                      should read -- a sinc(z)^2 function, although the sinc function allows an --

Column 3, Line 9       now reads: "further; insofar, the sine function is only mentioned here as"
                      should read -- further; insofar, the sinc function is only mentioned here as --

Column 3, Line 36      now reads: "one-sided sine function;"
                      should read -- one-sided sinc function; --

Column 3, Line 65      now reads: "complex design is required for this purpose, because the sine"
                      should read -- complex design is required for this purpose, because the sinc --

Signed and Sealed this
Fifteenth Day of December, 2020

Andrei Iancu
*Director of the United States Patent and Trademark Office*

CERTIFICATE OF CORRECTION (continued)
U.S. Pat. No. 10,698,225 B2

| | |
|---|---|
| Column 4, Line 11 | now reads: "complex design is required for this purpose, because the sine"<br>should read -- complex design is required for this purpose, because the sinc -- |
| Column 4, Line 30 | now reads: "sinc($v_z$) corresponds to a sine with zero position where $v_y$=0"<br>should read -- sinc($v_z$) corresponds to a sinc with zero position where $v_y$=0 -- |
| Column 4, Line 31 | now reads: "(on axis), which was resealed in the $v_y$ direction by means"<br>should read -- (on axis), which was rescaled in the $v_y$ direction by means -- |
| Column 4, Line 41 | now reads: "The two sine functions are affecting one another; a small"<br>should read -- The two sinc functions are affecting one another; a small -- |
| Column 4, Line 65 | now reads: "a thickness of approximately 1 μm in y (wavelength: 0.488"<br>should read -- a thickness of approximately 1 μm in y (wavelength: 0.488 μm) -- |
| Column 5, Line 4 | now reads: "On the axis (angle: zero), the sine functions simply"<br>should read -- On the axis (angle: zero), the sinc functions simply -- |
| Column 5, Line 5 | now reads: "overlap and "destroy" one another, i.e., the respective sine"<br>should read -- overlap and "destroy" one another, i.e., the respective sinc -- |
| Column 5, Line 8 | now reads: "To separate the sine functions from each other, i.e., to"<br>should read -- To separate the sinc functions from each other, i.e., to -- |
| Column 5, Line 15 | now reads: "times z times y). In general, the zero point of the sine"<br>should read -- times z times y). In general, the zero point of the sinc -- |
| Column 6, Line 22 | now reads: "$f_{v_z}(v_x, y_x) = \frac{\sin(arg_z)}{arg_z}$,"<br>should read -- $f_{v_z}(v_x, v_x) = \frac{\sin(arg_z)}{arg_z}$ -- |
| Column 7, Line 28 | now reads: "A section of an applied, asymmetrical and one-sided sine"<br>should read -- A section of an applied, asymmetrical and one-sided sinc -- |
| Column 7, Line 29 | now reads: "function F Sinc is visible in the aperture diaphragm as an"<br>should read -- function FSinc is visible in the aperture diaphragm as an -- |
| Column 7, Line 63 | now reads: "sponds to a three-dimensional (X, Y, Z) sine function as"<br>should read -- sponds to a three-dimensional (X, Y, Z) sinc function as -- |